(12) United States Patent
Morgen et al.

(10) Patent No.: US 12,512,715 B2
(45) Date of Patent: Dec. 30, 2025

(54) WINDING MAT FOR AN ELECTRIC MACHINE

(71) Applicant: Schaeffler Technologies AG & Co. KG, Herzogenaurach (DE)

(72) Inventors: Christian Morgen, Haueneberstein (DE); Dennis Kuhl, Bühl (DE); Alexander Lepold, Esslingen am Neckar (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 521 days.

(21) Appl. No.: 18/018,300

(22) PCT Filed: Jun. 16, 2021

(86) PCT No.: PCT/DE2021/100512
§ 371 (c)(1),
(2) Date: Jan. 27, 2023

(87) PCT Pub. No.: WO2022/028637
PCT Pub. Date: Feb. 10, 2022

(65) Prior Publication Data
US 2023/0291264 A1    Sep. 14, 2023

(30) Foreign Application Priority Data
Aug. 7, 2020   (DE) ......................... 102020120846.4

(51) Int. Cl.
*H02K 3/28*    (2006.01)
*H02K 15/043*    (2025.01)

(52) U.S. Cl.
CPC ........... *H02K 3/28* (2013.01); *H02K 15/0433* (2025.01)

(58) Field of Classification Search
CPC .............................. H02K 3/28; H02K 15/0433
See application file for complete search history.

(56) References Cited

U.S. PATENT DOCUMENTS

| | | | |
|---|---|---|---|
| 6,894,414 B1 | 5/2005 | Asao et al. | |
| 12,046,967 B2* | 7/2024 | Bernauer | ............ H02K 15/064 |
| 2013/0154428 A1 | 6/2013 | Sakuma et al. | |

(Continued)

FOREIGN PATENT DOCUMENTS

| | | |
|---|---|---|
| DE | 112015005047 | 8/2017 |
| DE | 102016118871 | 4/2018 |

(Continued)

*Primary Examiner* — Terrance L Kenerly
(74) *Attorney, Agent, or Firm* — Volpe Koenig

(57) ABSTRACT

A dynamo electric machine stator which is easy to assemble, includes a stator body with stator grooves and a winding mat with groove sections arranged in the stator grooves and lie one over the other in different radial positions, and with head sections which connect the groove sections. A wave winding conductor changes position by precisely one radial position in the stator grooves in the center of the extension of the wave winding conductor in the winding direction. The winding mat includes a first sub-winding mat with one first set of wave winding conductors for each section, the first sets being joined together in an X-shaped manner in the region of the position change such that the conductors are aligned in a specific manner at the intersections between the wave winding conductors.

20 Claims, 11 Drawing Sheets

(56) References Cited

U.S. PATENT DOCUMENTS

| | | | |
|---|---|---|---|
| 2015/0076953 A1 | 3/2015 | Tamura | |
| 2018/0034334 A1* | 2/2018 | Neet | H02K 3/28 |
| 2018/0287445 A1 | 10/2018 | Ishizuka et al. | |
| 2020/0052537 A1 | 2/2020 | Yoon et al. | |
| 2020/0052562 A1 | 2/2020 | Neet | |
| 2023/0378856 A1* | 11/2023 | Witt | H02K 15/026 |

FOREIGN PATENT DOCUMENTS

| | | |
|---|---|---|
| DE | 102018125830 | 4/2020 |
| EP | 2597754 | 5/2013 |
| WO | 2019166061 | 9/2019 |

* cited by examiner

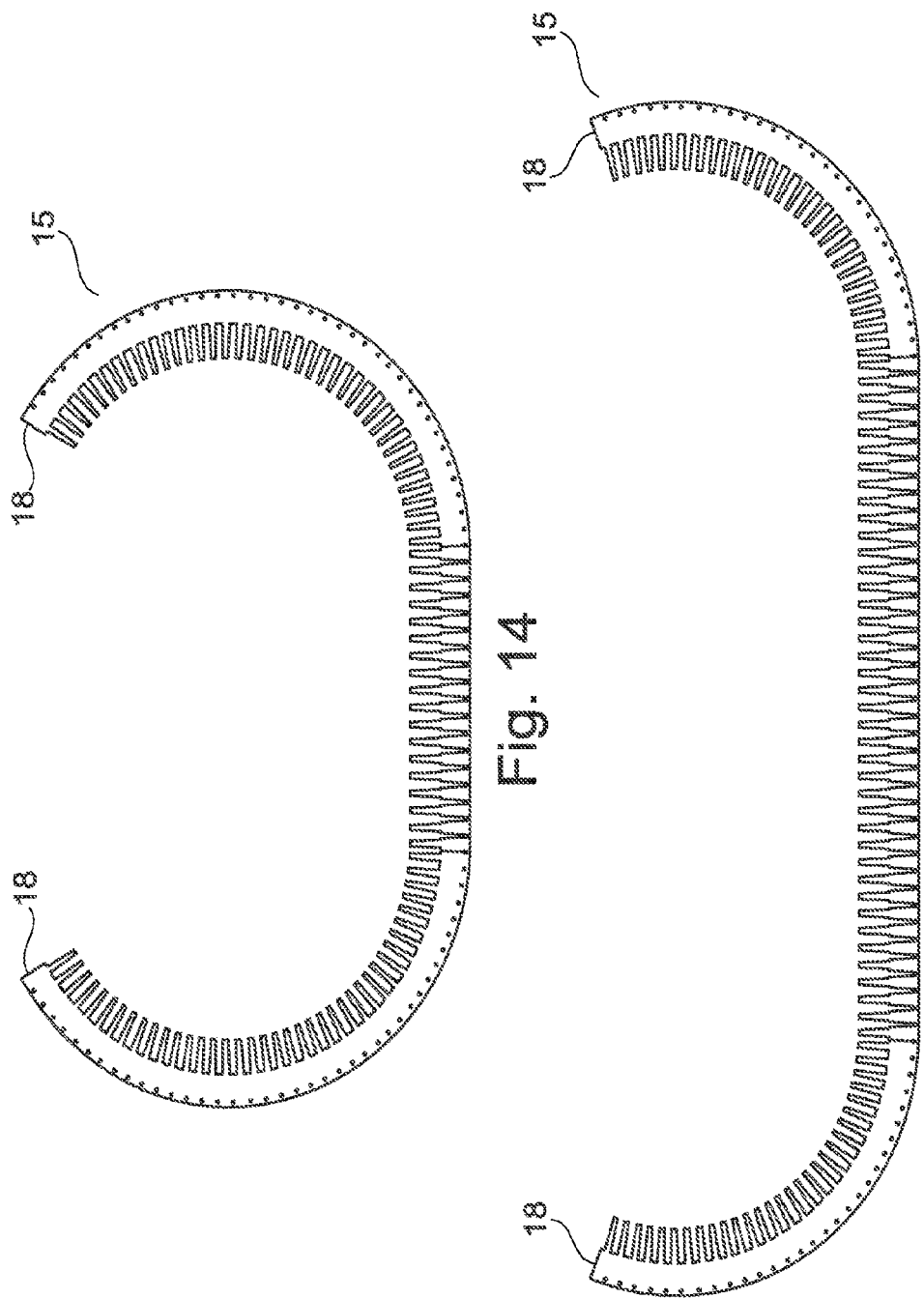

WINDING MAT FOR AN ELECTRIC MACHINE

CROSS-REFERENCE TO RELATED APPLICATIONS

This application is the U.S. National Phase of PCT Appln. No. PCT/DE2021/100512, filed Jun. 16, 2021, which claims the benefit of German Patent Appln. No. 102020120846.4, filed Aug. 7, 2020, the entire disclosures of which are incorporated by reference herein.

TECHNICAL FIELD

The disclosure relates to a stator of a dynamo electric machine comprising a stator body with stator grooves and at least one winding mat arranged in the stator grooves. In addition, the disclosure relates to a method for producing a winding mat for such a stator.

BACKGROUND

It is known to form such winding mats as so-called wave windings. Such a wave winding comprises a plurality of wave winding conductors, in which groove sections running in the grooves of the stator are connected to head sections arranged in the region of the winding heads. In a radial flux machine with grooves running in the axial direction of the stator, these groove sections are located alternately on both end faces of the stator carrier for each wave winding conductor, viewed in the circumferential direction. In this context, a stator carrier is understood to be the part of the stator that is not electromagnetically active, i.e., for example, a stator body without the field-generating coils. In particular, a stator body can be designed as a laminated stator core that is formed from stator laminations that lie on top of one another and are electrically insulated from one another.

A dynamo electric machine is known from U.S. Pat. No. 6,894,414 B1, in which the stator is manufactured as a so-called unrolled toothed chain. A winding mat, which forms a distributed winding, is first placed in the stator grooves of such a flat toothed chain. The extension of the winding mat in the winding direction corresponds to the extension of the flat toothed chain and thus the circumference of the resulting cylindrical stator. After inserting the winding mat, the toothed chain is bent into a cylindrical shape. The ends of the toothed chain are then welded together.

A dynamo electric machine with a wave winding is known from EP 259 77 54 A1, in which the distance between two groove sections connected to one another via a head section varies at least partially.

SUMMARY

The disclosure is based on the object of specifying a stator for a dynamo electric machine that is easy to produce and has a continuous winding scheme.

The object is achieved by a stator for a dynamo electric machine having one or more of the features disclosed herein. Furthermore, the object is achieved by a method for producing a winding mat for a stator of a dynamo electric machine having one or more of the features disclosed herein. Advantageous embodiments can be found below and in the claims.

Firstly, the stator can in particular comprise axially oriented stator grooves. However, the stator grooves can also have a skew in order to reduce torque ripples and cogging. At least one winding mat is arranged in the stator grooves. This winding mat is designed as a distributed winding. It contains two sets of continuous wave winding conductors for each section of the machine. Each wave winding conductor includes groove sections that can be placed in different radial positions within the stator grooves. In addition, each wave winding conductor comprises head sections, which each connect two groove sections outside the stator grooves in the area of the winding heads. In the case of a so-called wave winding, these head sections are arranged alternately on the two end faces of the stator for each wave winding conductor.

In electric machines with wave windings, parallel winding branches per phase are necessary because, especially in the case of a wave winding, a smaller conductor height (especially compared to so-called hairpin windings) is used and thus the number of conductors in the groove is increased. In order to limit the induced phase voltage, several winding branches are connected in parallel.

The so-called number of gaps, q, defines the number of grooves per pole and section of the dynamo electric machine. Each set can have q continuous wave winding conductors, the groove sections of which are distributed over a groove block of q adjacent stator grooves per pole. Thus, the wave winding conductors of a section can occupy different grooves within a groove block as well as occupy different positions in the radial direction within a groove since, according to the disclosure, a plurality of conductors are arranged one above the other in the stator grooves.

In order to prevent the formation of circulating currents when wave winding conductors of a specific section are connected in parallel, the sequence of the groove sections of the various wave winding conductors in a set can be interchanged between the groove blocks in such a way that each winding conductor occupies each of the q possible peripheral positions in a groove block the same number of times. In addition, it is provided that each wave winding conductor, in the center of its extension in the winding direction, changes position by exactly one radial position in the stator grooves.

The result of these two measures is that each wave winding conductor assumes every possible radial position in combination with every possible position within the groove block at least once and with equal frequency. The possible combinations of circumferential position within a groove block and radial position are evenly distributed among the wave winding conductors. In this way, circulating currents are effectively avoided when the winding conductors are connected in parallel. This also applies if the stator is designed with a plurality of winding mats of this structure, for example in order to increase the number of parallel connections. Each equivalent radial layer groove combination is used in each winding mat in this embodiment. This rule is fulfilled for each conductor of each section by continuously interchanging the conductor order of a section in the winding head and by changing the radial position in the center of the extension and thus in particular according to p poles of the wave winding conductor in the winding direction. Here, p denotes the number of pole pairs of the stator.

The stator body can have a toothed chain bent into a cylindrical shape with at least one axially extending joint at which the ends of the bent toothed chain are connected to one another. Such a configuration has the advantage that the stator grooves can very easily be fitted with a winding mat when the toothed chain is in the unwound state. In comparison, introducing a winding mat into a cylindrically designed stator body can represent a complex process.

If, in particular, the stator body is designed as a toothed chain, it is particularly advantageous if the extension of the winding mat in the winding direction corresponds to the inner circumference of the stator.

The number of pole pairs p of the stator can be an integer multiple of q. If the number of pole pairs p is a multiple of the number of gaps q, each possible position within a groove block in each of the two possible radial positions within the stator grooves is occupied multiple times by a wave winding conductor of a set.

The wave winding conductors of a set in a linearly expanded state may have axial symmetry in relation to a crossing scheme of the head sections with an axis of symmetry oriented parallel to a groove section. This ensures that each groove position within a groove block in each of the two radial layers is occupied at least once by a wave winding conductor of a set and the occupancy of these positions or radial layers is equally distributed among the different wave winding conductors of a set.

The stator comprises a first sub-winding mat which comprises precisely one first set of wave winding conductors for each section, said first sets being joined together in an X-shaped manner in the region of the position change such that at the intersections between the wave winding conductors of a first and second section the wave winding conductors of the first section constantly lie over those of the second section on one side of the position change and the wave winding conductors of the second section constantly lie over those of the first section on the other side. As a result, the sets of wave winding conductors of the different sections can be very easily preconfigured and then added to the first sub-winding mat.

A second sub-winding mat can be used in a similar way. This means that the stator comprises a second sub-winding mat which comprises precisely one second set of wave winding conductors for each section, said second sets being joined together in an X-shaped manner in the region of the position change such that at the intersections between the wave winding conductors of a first and second section the wave winding conductors of the first section constantly lie over those of the second section on one side of the position change and the wave winding conductors of the second section constantly lie over those of the first section on the other side.

A complete winding mat can now be formed from the first and second sub-winding mats. In this case, the second part-winding mat can now be rotated by 180 degrees about an axis oriented in the winding direction in a linearly unrolled state in relation to the first part-winding mat. The sub-winding mats can be joined together in an X-shaped manner in the region of the position change, so that the wave winding conductors of the first sub-winding mat constantly lie above the wave winding conductors of the second sub-winding mat on the one side of the position change and are constantly below the wave winding conductors of the second sub-winding mat on the other side of the position change.

This results in particularly compact winding heads if at least areas of the head sections of each wave winding conductor run offset on one side beyond the position change in the direction of the groove opening compared to the respectively connected groove sections and on the other side beyond the position change in the direction of the groove base compared to the respectively connected groove sections.

The maximum offset of the head sections can in each case correspond to that of half a radial position and thus half of the extension of the conductor viewed in the radial direction.

If the first and second sub-winding mats are fitted into one another, a particularly compact design is achieved by offsetting the head sections. The offset of the first sub-winding mat is always in the opposite direction to the offset of the second sub-winding mat. Viewed in the winding direction, these conditions are reversed at the position change.

A dynamo electric machine with a stator according to one of the embodiments described above is particularly suitable as a traction drive for an electric or hybrid vehicle. It is easy to manufacture and therefore suitable for large-scale production. Their electromagnetic behavior is extremely advantageous due to the elimination of circulating currents.

A further subject of the disclosure is a method for producing a winding mat for a stator of a dynamo electric machine. In the method, a first sub-winding mat is first produced. For this purpose, in a first step, a first set of q wave winding conductors is provided for each section of the stator. These wave winding conductors each comprise groove sections, which are to be arranged in stator grooves of a stator body of the dynamo electric machine, and head sections, which in each case connect two groove sections of a wave winding conductor in the region of the winding heads of the machine.

The q wave winding conductors are arranged in such a way that in each case q adjacent groove sections of the respective wave winding conductors follow one another at a distance of two stator grooves. It is advantageous here if the order of the groove sections of the various wave winding conductors is reversed within a set, so that each wave winding conductor occupies each of the q possible positions within a groove block the same number of times. If, for example, a groove block includes four possible positions, the number of gaps in the stator is therefore four, so the groove sections of the wave winding conductors involved in the set can be distributed equally over positions 1, 2, 3 and 4.

All the first sets of wave winding conductors formed in this way are then assembled or joined together to form the first sub-winding mat.

A second sub-winding mat can be produced in the same way as the first sub-winding mat.

The two sub-winding mats created in this way can finally be joined together. When the sub-winding mats are joined together, the groove sections of the wave winding conductors involved change position. This is done in such a way that the wave winding conductors of the first sub-winding mat are arranged under the wave winding conductors of the second sub-winding mat before and after the position change. After the sub-winding mats have been joined together, groove sections of the wave winding conductors of the first sub-winding mat lie above groove sections of the wave winding conductors of the second sub-winding mat on one side of the position change, while the exact opposite is true on the other side of the position change. In a later arrangement of the resulting winding mat in a stator body of the dynamo electric machine, the winding mat already occupies two radial positions, with each wave winding conductor being able to occupy each of the two radial positions in each of the q possible positions within a groove block the same number of times.

BRIEF DESCRIPTION OF THE DRAWINGS

The disclosure is explained in more detail below using the exemplary embodiments shown in the figures. In the figures:

FIG. 14 shows a fifth embodiment of a toothed chain for forming a cylindrical stator body and FIG. 15 shows a sixth embodiment of a toothed chain for forming a cylindrical stator body.

DETAILED DESCRIPTION

Figure 1:
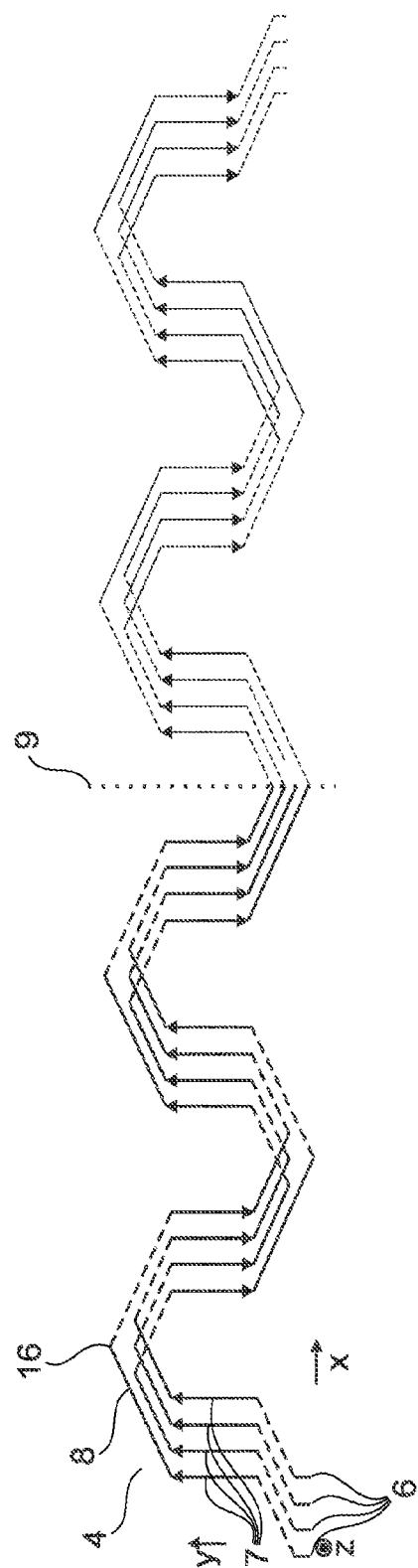
FIG. 1 shows a schematic representation of a first set of wave winding conductors.

FIG. 1 shows a schematic representation of a first set 4 of wave winding conductors according to an embodiment of the disclosure. The wave winding conductors 6 each comprise groove sections 7 which are connected to one another via head sections 8. After the wave winding conductors 6 have been laid in stator grooves of a stator body of a dynamo electric machine, the head sections 8 form the winding heads which protrude axially beyond the stator body, while the groove sections 7 are placed in stator grooves of the stator body.

The first set 4 shown is assigned to exactly one section of the machine and includes four wave winding conductors 6. These four wave winding conductors 6 are each arranged side by side in a groove block of four grooves in the stator body. The so-called number of gaps q in the stator, the number of grooves per pole and section, is therefore q=4. The number of pole pairs of the stator, which includes the illustrated set in its stator winding, is p=4.

The machine is a three-phase machine. Since a set of wave winding conductors 6 occupies four grooves per groove block and exactly one groove block is assigned to each of the eight poles of the stator, there are 32 stator grooves on each section of the machine. This results in a total number of grooves of N=96 for the three phases of the stator.

Since each groove block comprises four grooves, a groove section 7 of a wave winding conductor 6 can occupy four different positions in each groove block. As the schematic representation of the first set 4 of wave winding conductors 7 shows, each wave winding conductor 7 constantly changes its position from groove block to groove block.

It is assumed that the positions within the groove blocks are numbered continuously from left to right, increasing continuously from position one to position four. The wave winding conductor 6 in position one in the first groove block from the left is in position four in the subsequent second groove block. This wave winding conductor 6 is arranged in position three in the third groove block from the left. In the fourth groove block it is in position two. This wave winding conductor 6 changes to position three in the fifth groove block and changes back to position two in the sixth groove block. In the seventh groove block, the wave winding conductor 6 is again in position one. It then occupies position four in the eighth groove block.

The scheme formed by the first set 4 of wave winding conductors 6 has an axial symmetry with respect to an axis of symmetry 9 which, viewed in the winding direction, divides the first set 4 in the middle into two halves of equal length. This axial symmetry manifests itself in the design of the winding heads. At the pole which is located exactly above the axis of symmetry 9, the head sections 8 do not cross. The crossing scheme of the other head sections 8 is axisymmetric to the axis of symmetry 9.

The groove positions are occupied in a similar way by the other wave winding conductors 6 involved in the first set 4. The wave winding conductors 6 therefore do not follow a constant pitch. Rather, the distance between two groove sections 7 of a wave winding conductor changes continuously.

A positive and a negative associated head section conductor layer is defined in the head sections 8 arranged in the winding head. This is offset by half a conductor height in the positive or negative z-direction. The dashed conductor line in FIG. 1 is intended to illustrate an offset into the associated positive head section conductor layer and the solid line an offset into the associated negative conductor layer.

The head sections 8 to the left of the axis of symmetry 9 are initially oriented in the direction of the negative z-axis when viewed from the left. On reaching a winding head tip 10, the orientation reverses, so that the groove sections 7 connected via a head section 8 are ultimately arranged in the same z-axis position. After installation of the illustrated wave winding conductors 6 in the stator body, this means that these groove sections 7 are arranged in the same radial position.

In the region to the right of the axis of symmetry 9, the course of the head sections 8 is exactly the opposite. That is, viewed from left to right, a head section 8 runs up to the winding head tip 10 first in the positive z-direction and after the winding head tip in the negative z-direction, so that the groove sections 7 connected via said head section 8 are again in the same z-position and thus lie in the same radial position when installed.

A position change in the z-direction takes place on the axis of symmetry 9 and thus in the center of the first set 4 of wave winding conductors 6 of a section of the machine. The head sections 8 run in the negative z-direction on both sides of the winding head tip 10 arranged here. Here, too, the offset on the left and right side of the winding head tip 10 is half a conductor width in each case, viewed in the radial direction. Due to the same orientation of this offset in the z-direction, however, this results in a layer offset of the groove sections 7 connected via the head section 8 by exactly one conductor width. Accordingly, the groove sections 7 on the right side of the axis of symmetry in the grooves of the machine are placed one radial position closer in the direction of the groove base than the groove sections 7 to the left of the axis of symmetry 9.

As a result, the illustrated distribution of the groove sections 7 within the first set 4 with regard to the possible positions within the groove blocks involved and with regard to the radial positions occupied by the wave winding conductors 8 means that each wave winding conductor 8 occupies every possible position in the groove block and every possible radial position equally often. With this, the basis is already created within a set of wave winding conductors 8 so that with a consistent continuation of this scheme for all sets of wave winding conductors involved in the winding mat of the stator, the formation of circulating currents can be prevented despite parallel-connected conductor loops.

It is important for understanding that the positive head section conductor layer of the first sub-mat conductor layer corresponds to the negative winding head conductor layer of the second sub-mat conductor layer offset in the positive z-direction. Along the wave direction of a section in the positive x-direction according to FIG. 1, in the first sub-mat conductor layer after exiting the groove, there is an offset into the associated negative winding head conductor layer. In contrast, in the second conductor layer, after exiting the groove, there is an offset into the associated positive winding head conductor layer. This difference is due to the position change. Along the described positive wave direction, after exiting the groove, when changing layers, the conductors are initially offset into the negative winding head conductor layer associated with the first sub-mat conductor layer. In the winding head tip, the conductors change to the winding head conductor layer that is positive for the first sub-mat conductor layer. Accordingly, at the following groove entrance, there is an offset in the positive z-direction in the second sub-mat conductor layer. In the case of a structural design of the winding head, it is evident that there must also be an offset in the positive z-direction in the case of the groove entrances following along the positive wave direction in the second sub-mat conductor layer. Therefore, as described above, there must be an offset in the positive direction at the groove exits.

Figure 2:
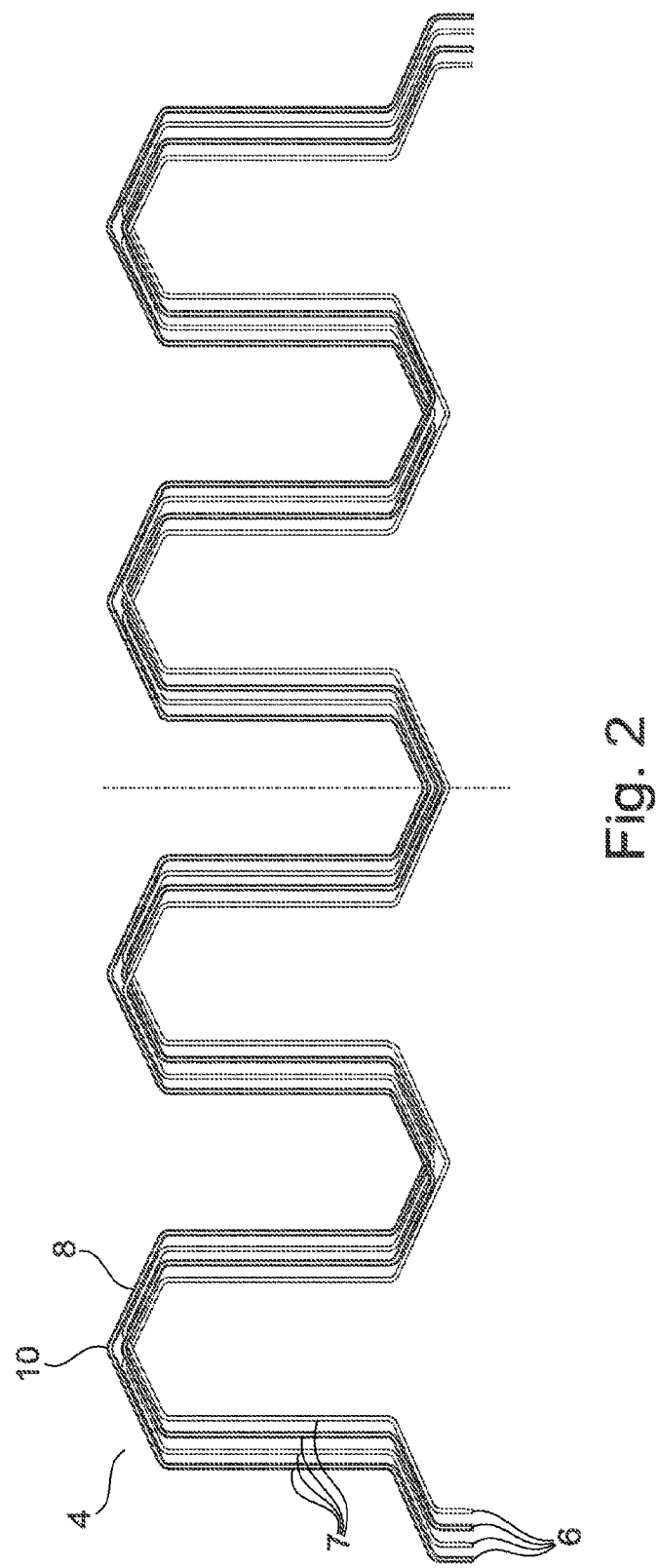
FIG. 2 shows a structural realization of the first set of wave winding conductors.

FIG. 2 shows a structural realization of the first set 4 of wave winding conductors 6.

The conductors are bent over the short edge in the winding head tip 10. The q parallel conductors of a section can be prefabricated separately from one other. This makes it possible to first bend the conductors in the xy plane and then, in a second step, use a punch to stamp the necessary conductor offsets in the winding head. The order in which these conductors are to be inserted into each other is different for each winding scheme with different parameters and must be examined separately in each case.

Such an insertion process will be discussed as an example with reference to FIG. 2. On closer inspection, it can be seen that the second wave winding conductor 6 in the left connection zone is arranged from the left in the first and in the seventh winding head section along the positive wave direction in front of the other conductors. In contrast, the conductor is arranged in the third and in the fifth winding head section behind the remaining wave winding conductors 6. In the remaining winding head sections, this conductor does not cross the other wave winding conductors 6, as a result of which the wave winding conductor 6 is arranged neither in front of nor behind another wave winding conductor 6. This conductor must therefore be the last to be inserted into the already arranged conductors of the section in the positive y-direction. In this case, the arrangement described must be implemented in the winding head sections. The remaining wave winding conductors 6 are arranged one below the other in the same order in the respective winding head sections. The second conductor from the right in the left connection zone is constantly ahead of the first conductor from the right in the left connection zone. Insertion of the remaining conductors is therefore not necessary. Thus, they can be placed one inside the other according to their order.

Figure 3:
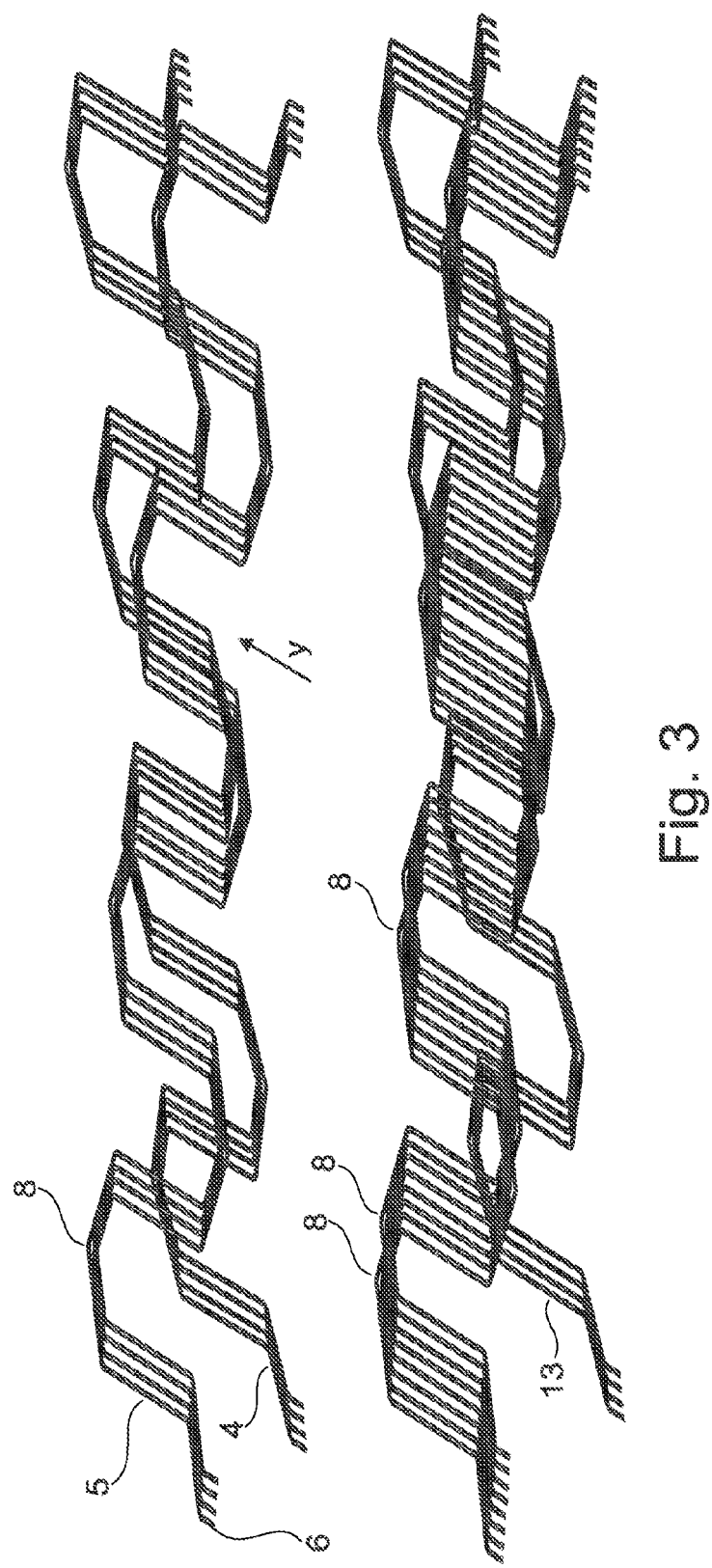
FIG. 3 shows a joining together of three first sets of wave winding conductors.

FIG. 3 shows a joining together of three first sets 4, 5, 13 of wave winding conductors 6 to form a first sub-winding mat, which accordingly includes a first set 4, 5, 13 of wave winding conductors 6 for each section of the machine. The first sets 4, 5, 13 shown have been produced in the same way, in particular inserted in the manner described in conjunction with FIG. 2.

The sections or the associated sets 4, 5, 13 of wave winding conductors 6 must then be inserted into one another to form the first sub-mat. The process described below is identical for each winding scheme with different parameters. The joining takes place with the aid of an x-shaped insertion of the individual first sets 4, 5, 13, as illustrated schematically in FIG. 3. Since the arrangement of the head sections 8 between the respective sections on the left and right of the position change is different, the individual sections must be pushed into one another in an x-shape in the y-direction and then rotated relative to one another, wherein this process can take place sequentially.

Figure 4:
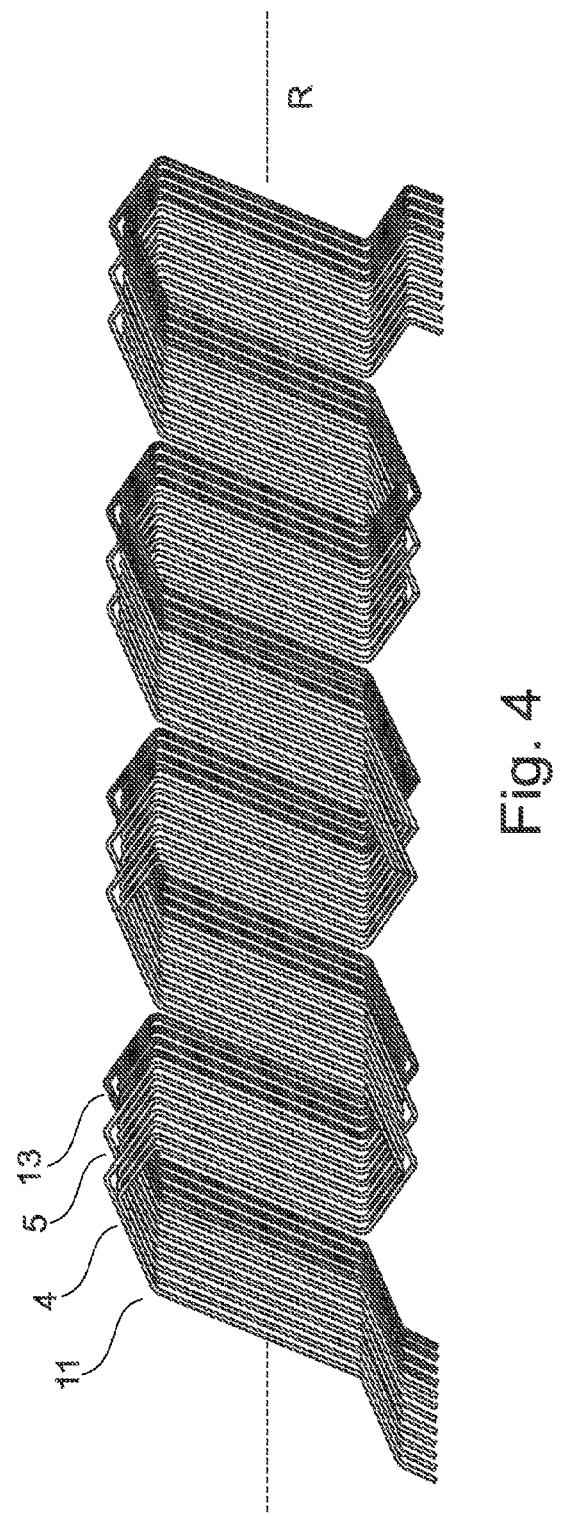
FIG. 4 shows a first sub-winding mat as a result of the three first sets of wave winding conductors being joined together.

According to this principle, the first set of the second section 5 is first joined to the first set of the first section 4. The first set of the third section 13 is then inserted into the sub-mat that has already been formed, and a finished first sub-winding mat is subsequently obtained. Such a first sub-winding mat 11 as a result of the three inserted sets 4, 5, 13 of wave winding conductors 6 is shown in FIG. 4. For an alternative number of sections, the sequential assembly is analogous. The different arrangement of the head sections 8 to the left and right of the position change is due to the different design of the winding head in the two sections.

Figure 5:
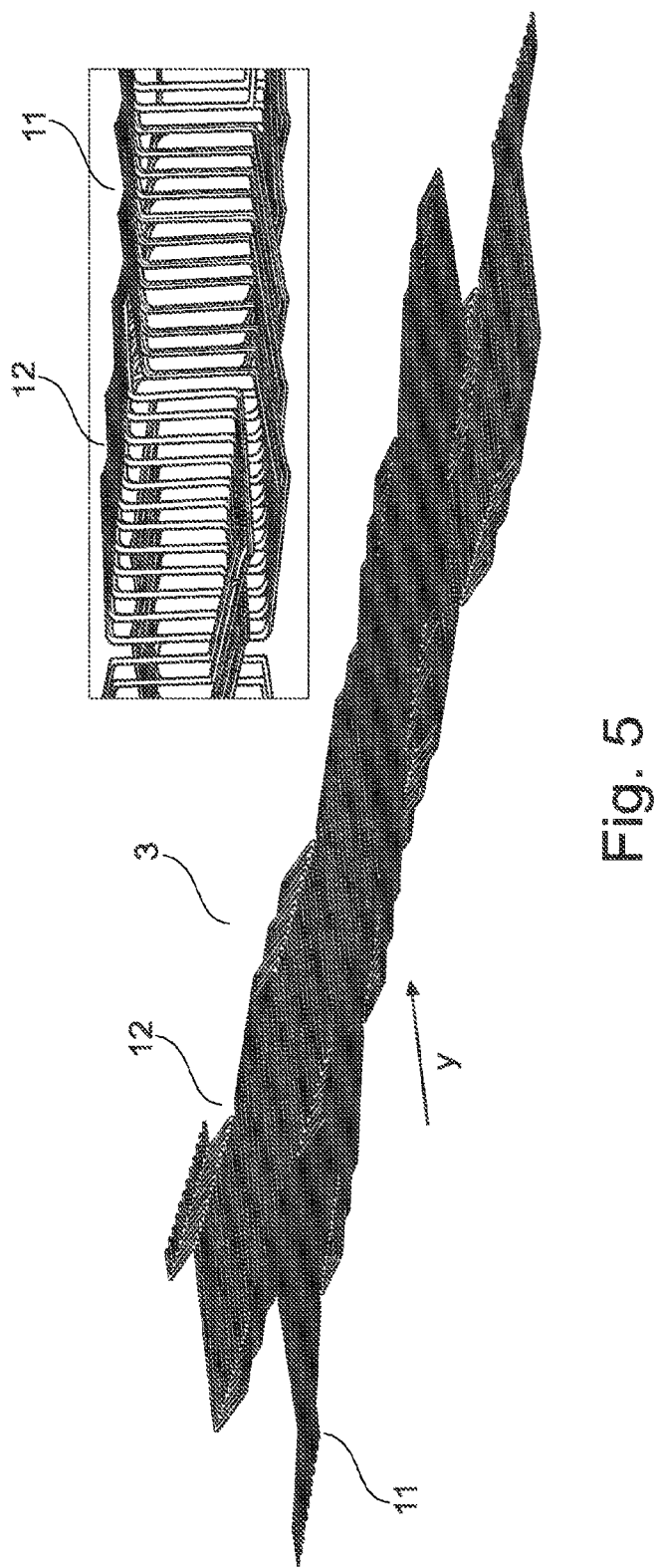
FIG. 5 shows a joining together of two sub-winding mats to form a winding mat.

A second sub-winding mat 12 is then produced in a completely analogous manner. The first and second sub-winding mats 11, 12 are lastly joined to form a winding mat 3. This process can be seen in FIG. 5.

As described above, each sub-winding mat 11, 12 is divided into two regions in which the conductors are in the different radial positions. Therefore, the layer groove positions that are not occupied in the first sub-winding mat 11 must be occupied by the second sub-winding mat 12 when they are inserted together. If the first sub-winding mat 11 shown in FIG. 4 is rotated by 180 degrees along the R axis, it can be shown in a structural embodiment that the rotated first sub-winding mat 11 (here referred to as the second sub-winding mat 12) forms the counterpart to the original first sub-mat 11 both in the region of the groove sections 7 and in the region of the head sections 8. Consequently, the second sub-winding mat 12 corresponds to the first sub-winding mat 11 rotated by 180 degrees along the R axis.

Accordingly, only one version of the sub-winding mat 11, 12 is necessary in the process, which considerably reduces the production effort. Analogously to the joining of the sets 4, 5, 13 of the individual sections, these two opposite sub-winding mats 11,12 must be fitted into one another in an x-shape in the y-direction and then rotated relative to one another. Viewed from the y-direction, the two sub-winding mats 11,12 intersect here along the position change of the sub-winding mats 11,12.

Figure 6:
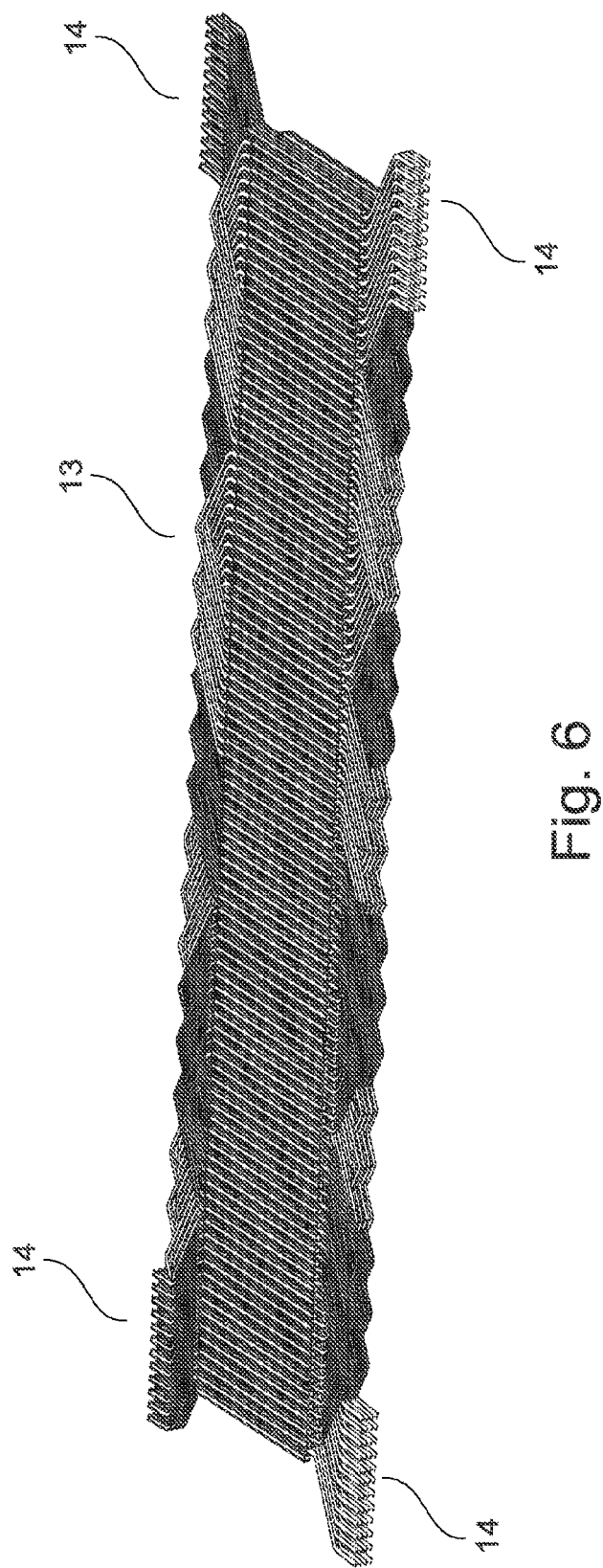
FIG. 6 shows a stack of a plurality of winding mats.

FIG. 6 shows a winding stack 13 made up of several winding mats 3. In the illustrated embodiment, this results in a flat winding with zn=8 conductor layers. Since each of the stacked winding mats 3 contains two conductor layers, four winding mats 3 are thus stacked.

The winding mats 3 can be stacked directly in the stator grooves of a stator body. This is achieved in a particularly simple manner if such a stator body, which is manufactured, for example, in the form of a laminated stator core, is designed as a toothed chain.

The number of stacked winding mats 3 can be flexibly selected. Due to the construction of winding mats, which are made up of two sub-mats 11, 12 and therefore form two conductor layers, the number of conductor layers in the entire winding stack 13 is an even number.

It can also be seen in FIG. 6 that connecting conductors 14 protrude from the winding stack 13 on both end faces at both ends of the winding stack 13. If the winding is placed in a toothed chain, these must be interwoven with the toothed chain due to the rolling up of the winding.

Figure 7:
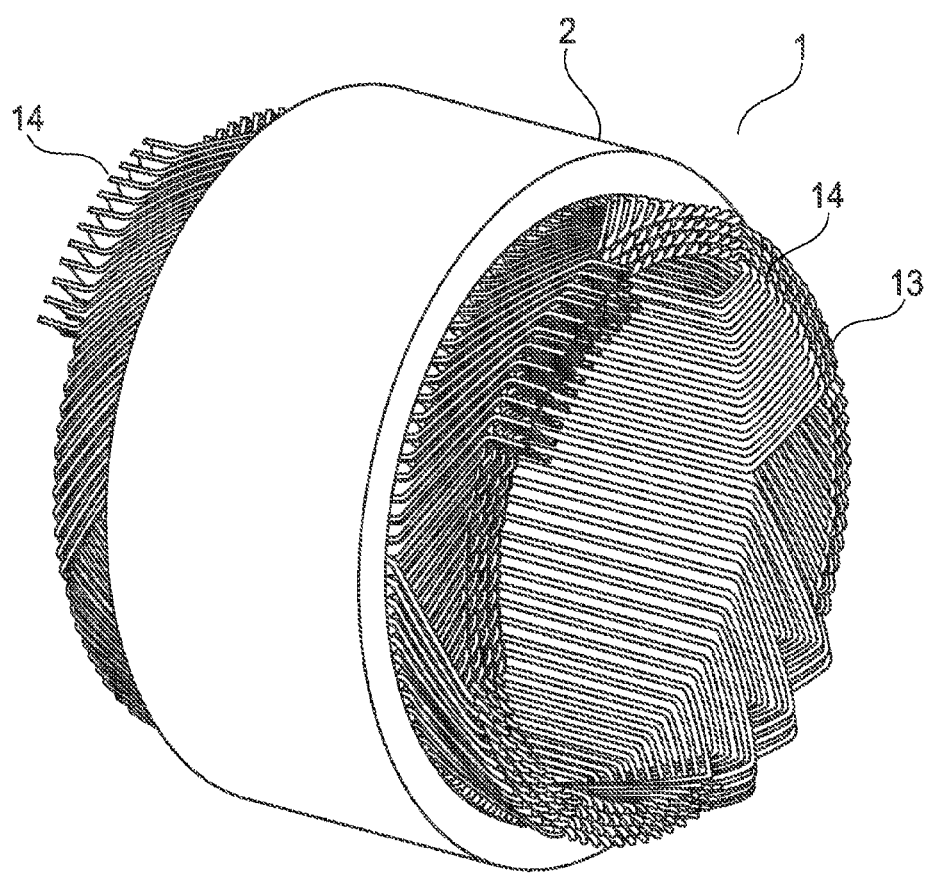
FIG. 7 shows a stator body with a winding stack placed in stator grooves of the stator body.

FIG. 7 shows a stator body with a winding placed in stator grooves of the stator body 2. A winding with a stator body 2 in the rolled-up state and with interwoven connecting conductors 14 is shown. A winding without interchanging the sequence of conductors in the winding head is shown schematically, but with the above-mentioned parameters.

Figure 8:
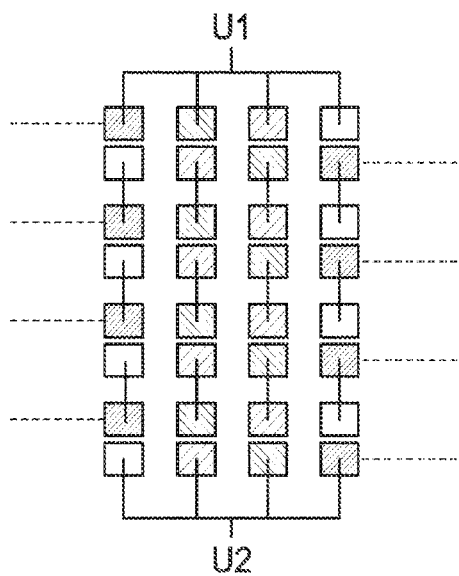
FIG. 8 shows a first circuit diagram for a winding according to an embodiment of the disclosure.
Figure 9:
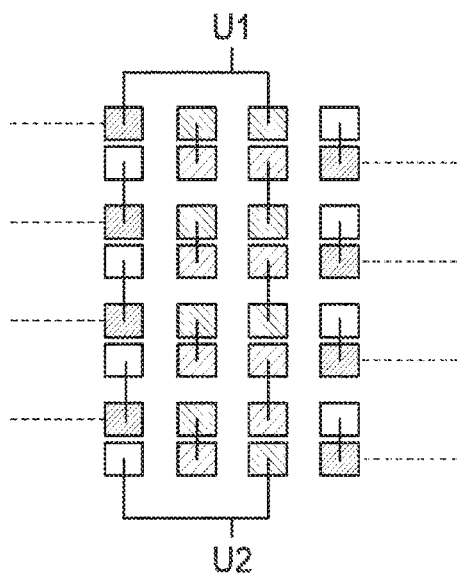
FIG. 9 shows a second circuit diagram for a winding according to an embodiment of the disclosure.

FIG. 8 shows a first circuit diagram for a winding stack 13 according to an embodiment of the disclosure, and FIG. 9 shows a second circuit diagram for a winding stack 13 according to an embodiment of the disclosure.

The stacked and rolled-up winding mats 3 must then be connected to one another. The interconnection takes place analogously on both end faces. In addition, the interconnection is the same for all sections, which is why it is only explained below using one section. In principle, it can be stated that the maximum number of parallel winding branches corresponds to the number of gaps q per end face. Thus, a maximum of a=2q parallel winding branches per section are possible for the complete winding stack 13. The interconnection must be examined individually for any number of gaps. Using a connection with q=4, the necessary considerations are illustrated as an example. After interweaving, the connecting conductors 14 are arranged in a matrix as viewed from the axial direction. The connecting conductors 14 of the different ends of a winding mat 3 are always on top of one another in the matrix-like arrangement, wherein only a sub-mat 11, 12 of the winding mat 3 is connected here when viewing an end face.

FIG. 8 schematically shows the wiring for four parallel branches per end face, and FIG. 9 shows two parallel branches per end face. The different hatchings are intended to clarify the different conductors of the winding stack 13. In addition, the associated transversal deviation in the winding head is shown for each connecting conductor level in the matrix, and, as expected, alternates continuously. The reversal of the conductor arrangement when the layer is changed has the effect that the conductor arrangement in both connecting conductor planes of a winding mat 3 is also reversed in the area of the connections. In the case of four parallel branches, the connection contact is made in the top and bottom connecting conductor level. In between, the respective superimposed connections of different winding mats 3 are connected to one another in series. This connecting concept can be applied to any other number of gaps, wherein the number of parallel branches per end face must correspond to the number of gaps.

A total of six different embodiments of a stator body in the form of what is known as a toothed chain 15 are shown in FIGS. 10 to 15. All of these versions are similar in that the stator body initially has two axially oriented end faces 18 on the circumference, which, after being fitted with a winding stack 13, can be connected to one another, for example, via welding, so that the stator body is given a cylindrical shape.

Figure 10:
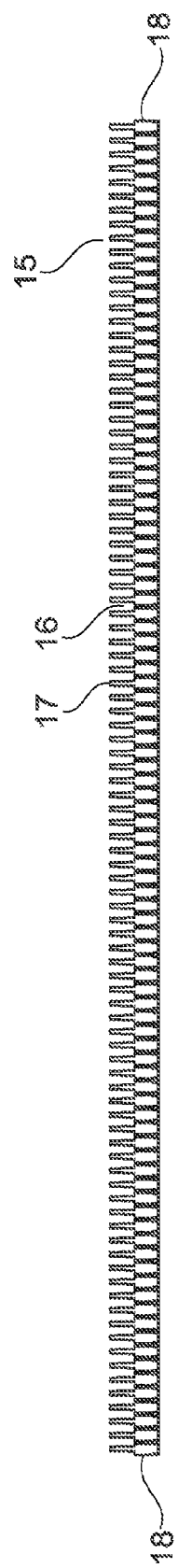
FIG. 10 shows a first embodiment of a toothed chain for forming a cylindrical stator body.

In the first embodiment according to FIG. 10, the individual stator teeth 17 and stator grooves 16 are also provided with reference numerals within the toothed chain.

In the first embodiment according to FIG. 10, the toothed chain 15 is in a completely linearly unwound form, so that assembly with the winding stack 13 is made possible in a manner that is similarly easy to handle as in the case of a linear motor. Each individual stator tooth 17 has a certain angular play that is substantially the same for all teeth. This is dimensioned in such a way that it is completely used up when the linear silent chain 15 is bent into its closed cylindrical shape.

Figure 11:
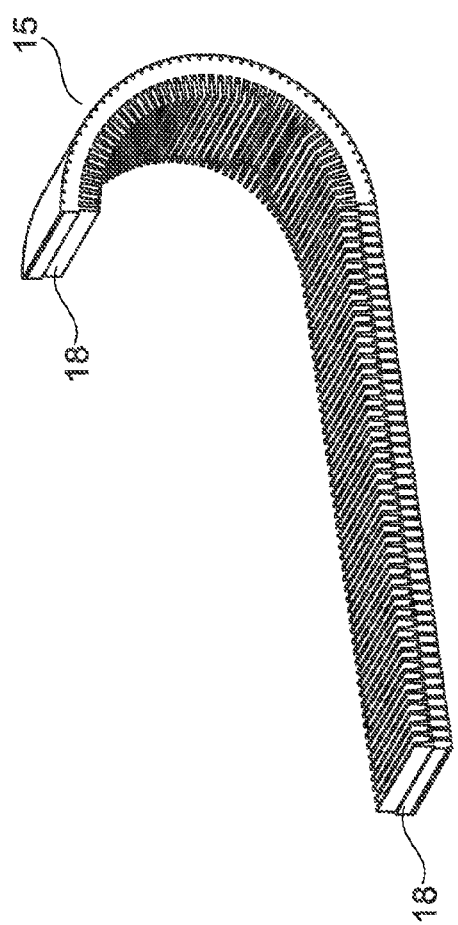
FIG. 11 shows a second embodiment of a toothed chain for forming a cylindrical stator body.

In the second embodiment according to FIG. 11, such flexibility in the circumferential direction is only given in the region of the laminated stator core that runs in a linear manner. This area adjoins a rigid section of the stator body that has already been formed into a semicircular arc.

Figure 12:
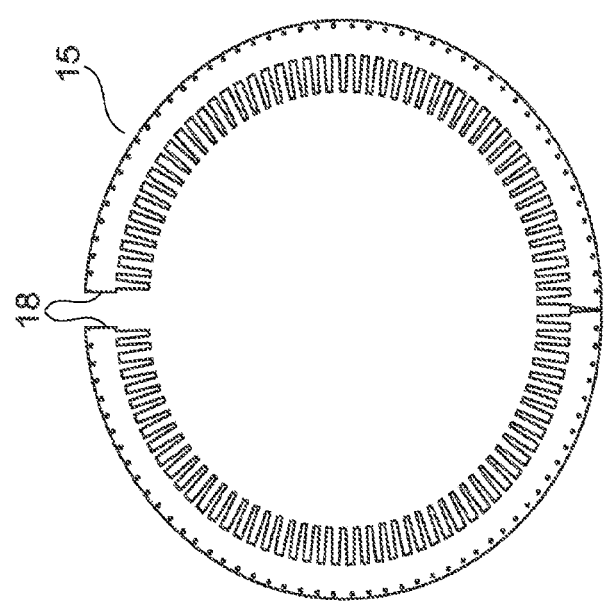
FIG. 12 shows a third embodiment of a toothed chain for forming a cylindrical stator body.

In the third embodiment according to FIG. 12, on the other hand, two rigid stator body halves with a semicircular cross section are connected to one another in an articulated manner at a point which is arranged opposite the joint with the two end faces 18.

Figure 13:
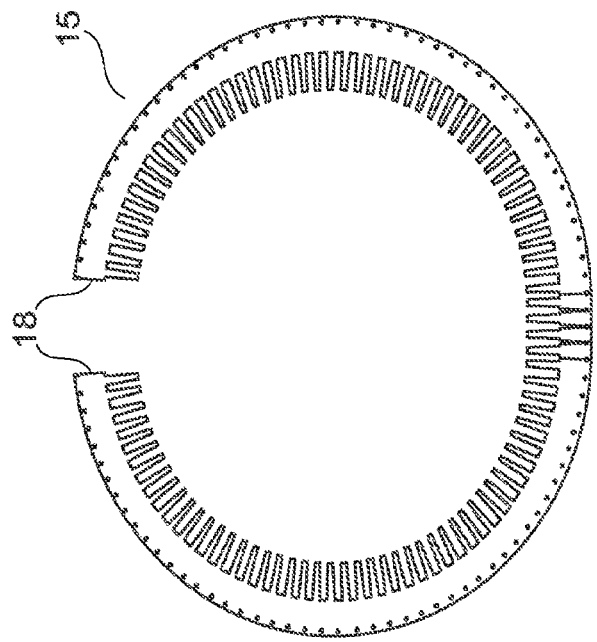
FIG. 13 shows a fourth embodiment of a toothed chain for forming a cylindrical stator body.

In the fourth embodiment according to FIG. 13, this articulation point is realized by means of a region of four articulated stator teeth 17 opposite the joint.

In the fifth and sixth embodiment (FIGS. 14 and 15), the area with the articulated stator teeth 17 is enlarged compared to FIG. 13 at the expense of the extension of the rigid, arc-shaped stator areas.

LIST OF REFERENCE NUMERALS

1 Stator
2 Stator body
3 Winding mat
4, 5, 13 First set
6 Wave winding conductors
7 Groove sections
8 Head sections
9 Axis of symmetry
10 Winding head tip
11 First sub-winding mat
12 Second sub-winding mat
13 Winding stack
14 Connecting conductor
15 Toothed chain
16 Stator grooves
17 Stator teeth
18 End face

The invention claimed is:

1. A stator of a dynamo electric machine, the stator comprising:
   a stator body with stator grooves;
   a winding mat with groove sections arranged in the stator grooves and lie one over another in different radial positions;
   head sections which connect the groove sections;

wave winding conductors that each change position by precisely one radial position in the stator grooves in a center of an extension of the wave winding conductor in a winding direction; and the winding mat comprises a first sub-winding mat, which comprises precisely one first set of said wave winding conductors for each said groove section, said first sets being joined together with an X-shape in a region of a position change such that at intersections between the wave winding conductors of a first and a second of said groove sections, the wave winding conductors of the first section constantly lie over said wave winding conductors of the second section on one side of the position change and the wave winding conductors of the second section constantly lie over said wave winding conductors of the first section on an other side.

2. The stator according to claim 1, wherein each said set has a set number of continuous wave winding conductors having the groove sections which are distributed over a groove block of a same set number of adjacent stator grooves per pole.

3. The stator according to claim 2, wherein a sequence of the groove sections of different ones of the wave winding conductors of one said set is interchanged between groove blocks such that each said winding conductor occupies each of the set number of possible circumferential positions in one said groove block a same number of times.

4. The stator according to claim 2, wherein a number of pole pairs of the stator is an integer multiple of the set number.

5. The stator according to claim 1, further comprising a second sub-winding mat which comprises precisely one second set of said wave winding conductors for each said groove section, wherein said second sets of said winding conductors are joined together with an X-shape in a region of a position change such that at the intersections between the wave winding conductors of a first and a second of said groove sections the wave winding conductors of the first section constantly lie over the wave winding conductors of the second section on one side of the position change and the wave winding conductors of the second section constantly lie over the wave winding conductors of the first section on an other side.

6. The stator according to claim 5, wherein the second sub-winding mat is rotated relative to the first sub-winding mat in a linearly unwound state by 180 degrees about an axis oriented in the winding direction, and the first and second sub-winding mats are joined together in an X-shape in a region of the position change, such that the wave winding conductors of the first sub-winding mat constantly lie over the wave winding conductors of the second sub-winding mat on one side of the position change and constantly lie under the wave winding conductors of the second sub-winding mat on an other side of the position change.

7. The stator according to claim 1, wherein an extension of the winding mat in the winding direction corresponds to an inner circumference of the stator.

8. The stator according to claim 1, wherein the wave winding conductors of the first set in a linearly expanded state have axial symmetry in relation to a crossing scheme of the head sections with an axis of symmetry which is oriented parallel to one said groove section.

9. The stator according to claim 1, wherein at least regions of the head sections of each said wave winding conductor run offset on the one side beyond the position change in the direction of the groove opening in relation to the respectively connected groove sections and on the other side beyond the position change in the direction of the groove base in relation to the respectively connected groove sections.

10. The stator according to claim 9, wherein a maximum offset of the head sections in each case corresponds to half of one said radial position.

11. The stator according to claim 1, wherein the stator body has a toothed chain bent into a cylindrical shape with at least one axially extending joint at which ends of the toothed chain after being bent are connected to one another.

12. A dynamo electric machine comprising a stator according to claim 1.

13. A method for producing a winding mat for a stator of a dynamo electric machine, the method comprising:
producing a first sub-winding mat by
providing a first set of with a set number of wave winding conductors for each section of the stator, wherein the wave winding conductors each have groove sections and head sections connecting the groove sections;
arranging the set number of wave winding conductors such that the groove sections of the respective wave winding conductors follow one another at a distance of two stator grooves; and
joining together in an X-shaped manner all the first sets to form the first sub-winding mat such that the wave winding conductors change position in a center region of extensions thereof as viewed in a winding direction, such that at intersections of the wave winding conductors of a first and second section, the wave winding conductors of the first section constantly lie above the wave winding conductors of the second section on one side of a position change and the wave winding conductors of the second section constantly lie above the wave winding conductors of the first section on an other side.

14. The method according to claim 13, further comprising the following steps:
creating a second sub-winding mat in a same way as the first sub-winding mat; and
joining together the first and second sub-winding mats, wherein the wave winding conductors of the first sub-winding mat are arranged under the wave winding conductors of the second sub-winding mat before the position change and over them after the position change.

15. The method according to claim 14, wherein the second sub-winding mat is rotated by 180 degrees relative to the first sub-winding mat about an axis oriented in the winding direction, and the first and second sub-winding mats are joined together in an X-shape in a region of the position change.

16. The method according to claim 13, wherein a sequence of the groove sections of the different wave winding conductors of the first set is interchanged between the head sections such that each said winding conductor occupies each of the set number of possible positions a same number of times.

17. The method according to claim 16, further comprising manufacturing the stator body as a linearly extended toothed chain, and, after being fitted with the winding mat, bending the linearly extended toothed chain, into a cylindrical shape.

18. The method according to claim 13, wherein the extension of the winding mat in the winding direction corresponds to an inner circumference of the stator.

19. The method according to claim 13, wherein the wave winding conductors of the first set are arranged relative to each other such that the wave winding conductors have axial symmetry in relation to a crossing scheme of the head sections with an axis of symmetry which is oriented parallel to the groove section.

20. The method according to claim 13, wherein at least a region of the head sections of each said wave winding conductor is offset on the one side, beyond the position change, in a direction of the groove opening relative to the connected groove sections and is offset on the other side, beyond the position change, in a direction of the groove base in relation to the connected groove sections, and the offset in each case corresponds to that of half the extension of the groove sections in a radial direction of the stator grooves.

\* \* \* \* \*